United States Patent
Wang et al.

(10) Patent No.: US 8,504,263 B2
(45) Date of Patent: Aug. 6, 2013

(54) ACCUMULATOR WORKING VOLUME MANAGEMENT AND ADAPTATION

(75) Inventors: Hongyu Wang, Northville, MI (US); Staffan Lyberg, Gotebor (SE); Tobias Berndtson, Grästorp (SE)

(73) Assignee: GM Global Technology Operations LLC

( * ) Notice: Subject to any disclaimer, the term of this patent is extended or adjusted under 35 U.S.C. 154(b) by 428 days.

(21) Appl. No.: 12/850,134

(22) Filed: Aug. 4, 2010

(65) Prior Publication Data

US 2011/0264339 A1 Oct. 27, 2011

Related U.S. Application Data

(60) Provisional application No. 61/327,357, filed on Apr. 23, 2010.

(51) Int. Cl.
*G06F 7/00* (2006.01)
*B60W 10/02* (2006.01)

(52) U.S. Cl.
USPC .......................................... 701/53; 192/3.51

(58) Field of Classification Search
None
See application file for complete search history.

(56) References Cited

U.S. PATENT DOCUMENTS

| | | | | |
|---|---|---|---|---|
| 4,711,127 | A * | 12/1987 | Hafner | 73/302 |
| 4,870,390 | A * | 9/1989 | Hosoda et al. | 340/453 |
| 5,915,512 | A * | 6/1999 | Adamis et al. | 192/3.61 |
| 6,591,705 | B1 * | 7/2003 | Reik et al. | 74/343 |
| 6,634,247 | B2 * | 10/2003 | Pels et al. | 74/329 |
| 6,675,668 | B2 * | 1/2004 | Schamscha | 74/340 |
| 7,021,261 | B2 * | 4/2006 | Joos et al. | 123/179.17 |
| 7,155,993 | B2 * | 1/2007 | Koenig et al. | 74/331 |
| 7,500,411 | B2 * | 3/2009 | Gumpoltsberger | 74/329 |
| 7,500,932 | B2 * | 3/2009 | Katakura et al. | 475/123 |
| 7,621,844 | B2 * | 11/2009 | Kishi | 477/120 |
| 8,241,161 | B2 * | 8/2012 | Schoenek | 475/5 |
| 8,313,406 | B2 * | 11/2012 | Braford, Jr. | 475/218 |
| 2002/0193198 | A1 * | 12/2002 | Naunheimer | 475/116 |
| 2005/0221943 | A1 * | 10/2005 | Kuhstrebe | 475/207 |
| 2006/0101933 | A1 * | 5/2006 | Koenig et al. | 74/333 |
| 2008/0141808 | A1 * | 6/2008 | Gumpoltsberger | 74/340 |
| 2009/0209383 | A1 * | 8/2009 | Olson et al. | 475/120 |
| 2009/0236906 | A1 * | 9/2009 | Walker | 303/152 |
| 2010/0016115 | A1 * | 1/2010 | Braford, Jr. | 475/218 |
| 2011/0092335 | A1 * | 4/2011 | Lundberg et al. | 477/79 |
| 2011/0168510 | A1 * | 7/2011 | Lundberg et al. | 192/3.51 |

* cited by examiner

*Primary Examiner* — Mussa A Shaawat (57) ABSTRACT

A dual clutch transmission (DCT) control module includes a pressure determination module that determines a measured pre-charge pressure of an accumulator. A motor control module determines an actual pre-charge pressure based on the measured pre-charge pressure, stored previous pre-charge pressures, and ambient temperature, and controls a pump motor based on the actual pre-charge pressure.

22 Claims, 5 Drawing Sheets

ACCUMULATOR WORKING VOLUME MANAGEMENT AND ADAPTATION

CROSS-REFERENCE TO RELATED APPLICATIONS

This application claims the benefit of U.S. Provisional Application No. 61/327,357, filed on Apr. 23, 2010. The disclosure of the above application is incorporated herein by reference in its entirety.

FIELD

The present disclosure relates to dual clutch transmission control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A manual transmission drivetrain includes an internal combustion engine (ICE), a clutch and a manual transmission. The clutch engages with a flywheel on the ICE and transfers torque output of the engine to the manual transmission. Torque transfer from the ICE to the transmission is interrupted when a vehicle operator manually shifts between gears of the transmission. During a gear shift event, the clutch is disengaged (i.e. the ICE is disengaged from the transmission), a desired gear is manually selected, and the clutch is reengaged. Disengagement of the ICE from the transmission can negatively affect fuel economy and vehicle acceleration.

An automatic transmission drivetrain may include an internal combustion engine (ICE), a torque converter and an automatic transmission with planetary gear sets. The ICE provides output torque to the torque converter. The torque converter transfers torque from the ICE to the automatic transmission based on engine speed. The planetary gear sets include sun, carrier and ring gears that each has input, output and stationary operating states. Different gear ratios are selected by adjusting the operating state of each of the planetary gears in the planetary gear sets. An automatic transmission drivetrain provides uninterrupted torque transfer from the ICE to an output shaft of the automatic transmission. Typically, complex logic based approaches are used to control operating states of the planetary gears.

A dual-clutch transmission (DCT) drivetrain includes an ICE and a DCT (or semi-automatic transmission). The DCT includes two clutches, inner and outer transmission shafts, and two gear sets with respective gear shafts and/or lay shafts. As an example, the inner transmission shaft may be associated with a first gear set and controlled using a first clutch. The outer transmission shaft may be associated with a second gear set and controlled using a second clutch. The first gear set may include first, third and fifth gears. The second gear set may include second, fourth and sixth gears. By using two transmission shafts, a DCT drivetrain can provide uninterrupted torque transfer between the ICE and an output shaft of the DCT during gear shifts. This decreases shift times and improves fuel economy.

SUMMARY

A dual clutch transmission (DCT) control module includes a pressure determination module that determines a measured pre-charge pressure of an accumulator. A motor control module determines an actual pre-charge pressure based on the measured pre-charge pressure, stored previous pre-charge pressures, and ambient temperature, and controls a pump motor based on the actual pre-charge pressure.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
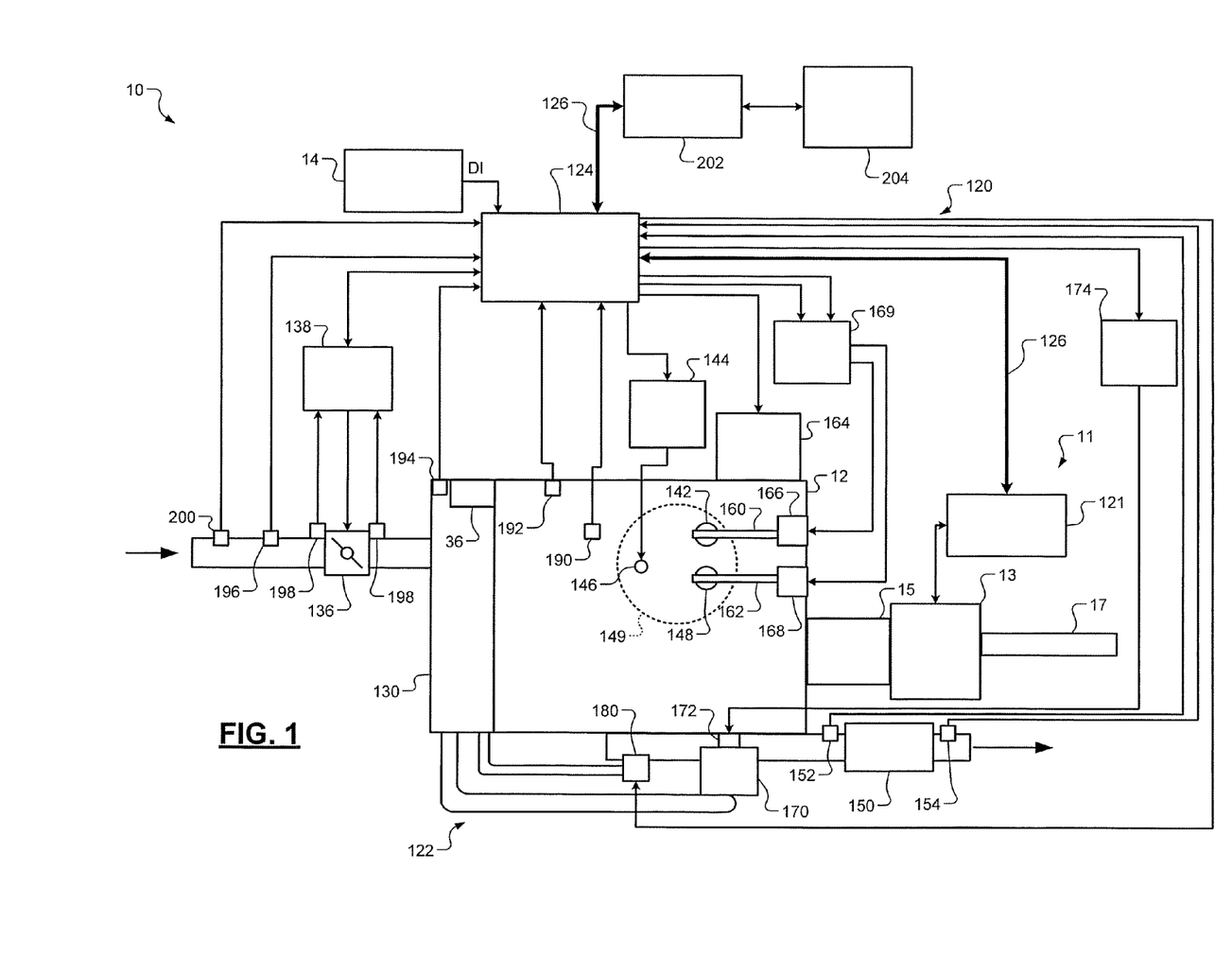
FIG. 1 is a functional block diagram of an exemplary dual clutch transmission (DCT) drivetrain system and corresponding DCT control system according to the present disclosure.
Figure 2:
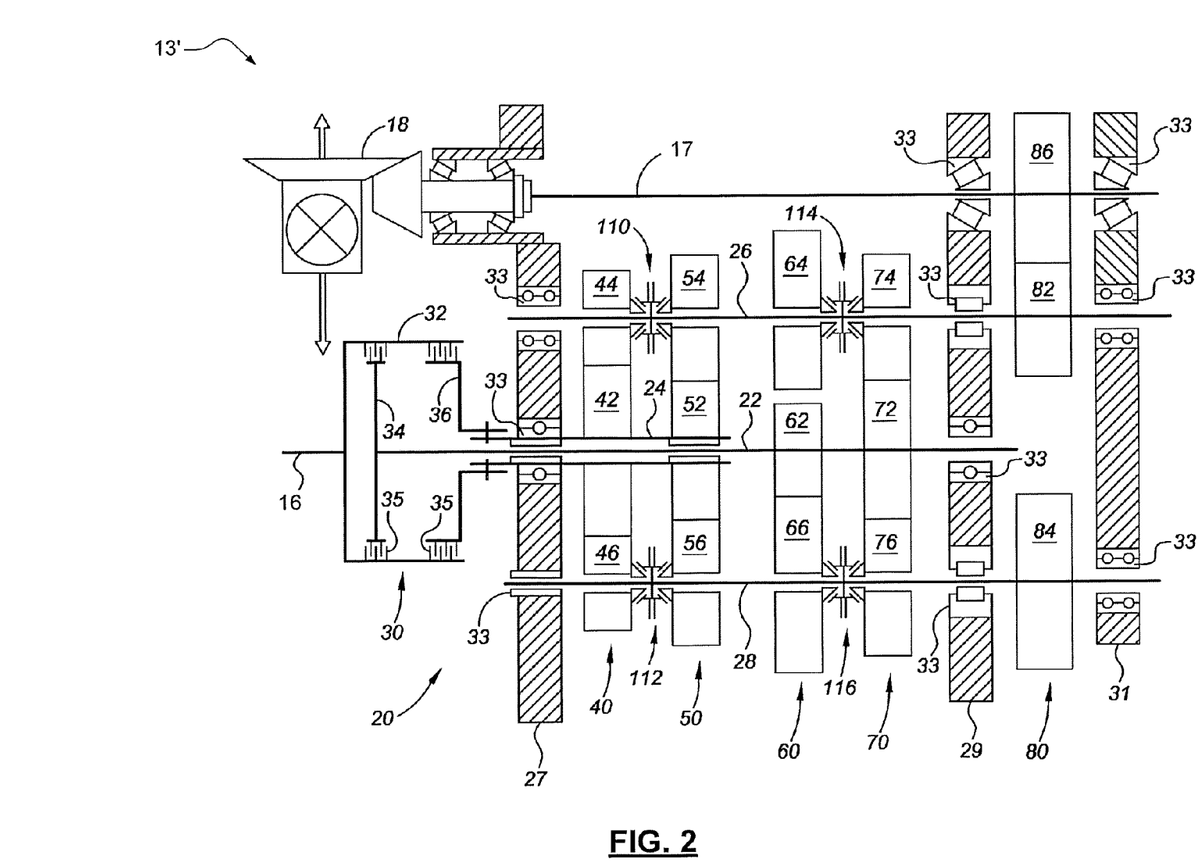
FIG. 2 is a schematic diagram of a DCT.

In FIG. 1, an exemplary dual clutch transmission (DCT) drivetrain (shift sequencing) system 10 and corresponding DCT control system 11 are shown. The DCT drivetrain system 10 includes an internal combustion engine (ICE) 12 and a DCT 13 (example of a DCT is shown in FIG. 2). The ICE 12 combusts an air/fuel mixture to produce drive torque for a vehicle based on information from a driver input module 14 (e.g., driver input signal DI) and other information described below. While a spark ignition type engine is described herein, the present disclosure is applicable to other types of torque producers, such as gasoline type engines, gaseous fuel type engines, diesel type engines, propane type engines, and hybrid type engines. The DCT control system 11 selects transmission gears and performs gear sequencing based on torque output of the engine, the driver input signal DI and other information described below.

The DCT 13 may be a dry or wet DCT. A wet DCT refers to a DCT that includes wet clutches and bathes components in lubricating fluid to reduce friction and heat. A dry DCT does not include a fluid bath, but has decreased drag or spin loss and improved fuel economy over a wet DCT. Wet DCTs are often used for higher torque applications than dry DCTs. The DCT 13 may be directly connected to the ICE 12 or may be connected to the ICE 12 via a torque converter and/or a dual mass flywheel 15, as shown. A dual mass flywheel may be used to: reduce torsional vibration induced by engine firing pulses; eliminate excessive transmission gear rattle; reduce gear change/shift effort; and improve fuel economy.

In FIG. 2, a DCT 13' is shown that have multiple selectable gear ratios. In the example shown, the DCT 13' has 7 forward gear ratios and 1 reverse gear ratio. The DCT 13' includes an input shaft 16 and output shaft 17. The input shaft 16 receives torque from, for example, the ICE 12 and/or the dual mass flywheel 15. The output shaft 17 is connected to a final drive unit 18.

The DCT 13' further includes a countershaft gearing arrangement 20 with a first interconnecting shaft 22 and a second interconnecting shaft 24, which is a sleeve shaft concentric with the first interconnecting shaft 22. The countershaft gearing arrangement 20 further includes a first countershaft (lay shaft) 26 and a second countershaft 28. The countershafts 26, 28 may be spaced apart from and parallel with the input shaft 16, the output shaft 17 and the interconnecting shafts 22, 24.

The output shaft 17, the interconnecting shafts 22, 24 and the countershafts 26, 28 are supported by support members including a first housing member 27, a second housing member 29, and a third housing member 31. The housing members 27, 29, 31 are fitted with bearings 33 for rotatably supporting the output shaft 17, the first and second interconnecting shafts 22, 24, and the countershafts 26, 28.

A dual clutch 30 is connected between input shaft 16 and the first and second interconnecting shafts 22, 24. The dual clutch 30 includes a clutch housing 32 connected for rotation with input shaft 16. Further, the dual clutch 30 has first and second clutch elements or hubs 34 and 36. The clutch elements 34 and 36 and the housing 32 provide a dual friction clutch assembly. The clutch elements 34, 36 and the clutch housing 32 have friction plates 35 mounted thereon that interact to provide two friction clutches.

The clutch element 34 is connected for rotation with the first interconnecting shaft 22. The clutch element 36 is connected for rotation with the second interconnecting shaft 24. Thus, selective engagement of the clutch element 34 with the clutch housing 32 connects the input shaft 16 for rotation with first interconnecting shaft 22. Selective engagement of the clutch element 36 with the clutch housing 32 connects the input shaft 16 for rotation with second interconnecting shaft 24.

The countershaft gearing arrangement 20 also includes co-planar and intermeshing gear sets 40, 50, 60, 70, and 80. The gear set 40 includes gear 42, gear 44, and gear 46. Gear 42 is connected for rotation with the second interconnecting shaft 24 and intermeshes with gear 44 and gear 46. Gear 44 is selectively connectable for rotation with the first countershaft 26. Gear 46 is selectively connectable for rotation with the second countershaft 28.

Co-planar gear set 50 includes gear 52, gear 54, and gear 56. Gear 52 is connected for rotation with the second interconnecting shaft 24 and intermeshes with gear 54 and gear 56. Gear 54 is selectively connectable for rotation with the first countershaft 26. Gear 56 is selectively connectable for rotation with the second countershaft 28.

Co-planar gear set 60 includes gear 62, gear 64, and gear 66. Gear 62 is connected for rotation with the first interconnecting shaft 22 and intermeshes with gear 66. Gear 66 is selectively connectable for rotation with the second countershaft 28. Gear 64 is selectively connectable for rotation with the first countershaft 26 and is also intermeshed with gear 66.

Co-planar gear set 70 includes gear 72, gear 74, and gear 76. Gear 72 is connected for rotation with the first interconnecting shaft 22 and intermeshes with gear 74 and gear 76. Gear 74 is selectively connectable with the first countershaft 26. Gear 76 is selectively connectable with the second countershaft 28. Co-planar or transfer gear set 80 includes gear 82, gear 84, and gear 86. Gear 82 is connected for rotation with the first countershaft 26 and intermeshes with gear 86. Gear 86 is connected for rotation with the output shaft 17. Gear 84 is selectively connectable for rotation with the second countershaft 28 and is also intermeshed with gear 86.

The DCT 13' further includes synchronizers 110, 112, 114, and 116. Each of the synchronizers 110, 112, 114, and 116 may include a shift fork (not shown) that is bi-directionally translated by an actuator or piston (not shown) into at least two engaged positions and a neutral or disengaged position.

For example, synchronizer 110 is selectively engageable with gear 44 or gear 54. Once engaged, the synchronizer 110 connects gear 44 or gear 54 to the first countershaft 26 for rotation therewith. Synchronizer 112 is selectively engageable with gear 46 or gear 56. Once engaged, the synchronizer 112 connects gear 46 or gear 56 to the second countershaft 28 for rotation therewith. Synchronizer 114 is selectively engageable with gear 64 or gear 74. Once engaged, the synchronizer 114 connects gear 64 or gear 74 to the first countershaft 26 for rotation therewith. Synchronizer 116 is selectively engageable with gear 66 or gear 76. Once engaged, the synchronizer 116 connects gear 66 or gear 76 to the second countershaft 28 for rotation therewith.

The DCT 13' is capable of transmitting torque from the input shaft 16 to the output shaft 17 based on the selected gear ratio. Each forward torque ratio and reverse torque ratio is attained by engagement of the clutch elements 34, 36 in the dual clutch 30 and one or more of the synchronizers 110, 112, 114, and 116.

As an example, to establish a first forward torque ratio (i.e. a 1st gear), clutch element 36 of the dual clutch 30 is engaged and synchronizer 110 is engaged to connect gear 54 to the first countershaft 26. By this engagement, clutch element 36 of the dual clutch 30 transfers torque from the input shaft 16 through clutch housing 32 to the second interconnecting shaft 24. Further, torque is transferred from the second interconnecting shaft 24 through gear 52 to gear 54. Upon engagement of synchronizer 110, gear 54 transfers torque to the first countershaft 26. The first countershaft 26 transfers the torque to gear 82. Gear 82 transfers the torque to gear 86, which in turn transfers the torque to the output shaft 17. The output shaft 17 transfers the torque to the final drive unit 18. Other gear ratios may be selected by engagement of respective gears and shafts.

Referring again to FIG. 1, the DCT drivetrain system 10 includes the DCT control system 11 and may include an engine control system 120. The DCT control system 11 includes the DCT 13 and a DCT control module 121. The engine control system 120 includes the ICE 12, an exhaust system 122 and an engine control module (ECM) 124. The DCT control module 121 and the ECM 124 may communicate with each other via serial and/or parallel connections and/or via a car area network (CAN) 126.

In operation, air is drawn into an intake manifold 130 of the ICE 12 through a throttle valve 136. The ECM 124 commands a throttle actuator module 138 to regulate opening of the throttle valve 136 to control the amount of air drawn into the intake manifold 130 based on, for example, information from the driver input module 14. The driver input module 14 may be or receive signals from, for example, an accelerator pedal. Air from the intake manifold 130 is drawn into cylinders of the ICE 12 through an intake valve 142. While the ICE 12 may include multiple cylinders, for illustration purposes, a single representative cylinder 149 is shown.

The ECM 124 controls the amount of fuel injected into the intake manifold 130 and/or the cylinder 149. The injected fuel mixes with the air and creates the air/fuel mixture in the cylinder 149. A piston (not shown) within the cylinder 149 compresses the air/fuel mixture. Based upon a signal from the ECM 124, a spark actuator module 144 of an ignition system energizes a spark plug 146 in the cylinder 149, which ignites the air/fuel mixture.

The combustion of the air/fuel mixture drives the piston down, thereby driving a rotating crankshaft (not shown). The piston then begins moving up again and expels the byproducts of combustion through an exhaust valve 148. The byproducts of combustion are exhausted from the vehicle via the exhaust system 122.

The exhaust system 122 may include a catalytic converter 150, a pre-converter (primary) $O_2$ sensor 152, and a post-converter (secondary) $O_2$ sensor 154. The sensors 152, 154 communicate with the ECM 124. The catalytic converter 150 is used to control emission output. The intake and exhaust valves 142, 148 may be controlled by a cylinder actuator module 164 via respective camshafts 160, 162 and cam phasers 166, 168. The cam phasers 166, 168 are controlled via a phaser actuator module 169.

The engine control system 120 may include a boost device that provides pressurized air to the intake manifold 130. For example, FIG. 1 depicts a turbocharger 170. The turbocharger 170 provides a compressed air charge to the intake manifold 130. A wastegate 172 may allow exhaust gas to bypass the turbocharger 170, thereby reducing the turbocharger's output (or boost). The ECM 124 controls the turbocharger 170 via a boost actuator module 174. The boost actuator module 174 may modulate the boost of the turbocharger 170 by controlling the position of the wastegate 172. Alternate engine systems may include a supercharger that provides compressed air to the intake manifold 130 and is driven by the crankshaft. The engine control system 120 may further include an exhaust gas recirculation (EGR) valve 180, which selectively redirects exhaust gas back to the intake manifold 130.

The DCT control system 11 and/or the engine control system 120 may measure the speed of the crankshaft (engine speed) in revolutions per minute (RPM) using an RPM sensor 190. Temperature of the ICE 12 may be measured using an engine coolant or oil temperature (ECT) sensor 192. The ECT sensor 192 may be located within the ICE 12 or at other locations where the coolant and/or oil is circulated, such as a radiator (not shown).

The pressure within the intake manifold 130 may be measured using a manifold absolute pressure (MAP) sensor 194. In various implementations, engine vacuum may be measured, where engine vacuum is the difference between ambient air pressure and the pressure within the intake manifold 130. The mass of air flowing into the intake manifold 130 may be measured using a mass air flow (MAF) sensor 196. The ECM 124 determines cylinder fresh air charge primarily from the MAF sensor 196 and calculates a desired fuel mass using open loop, closed loop and transient fueling algorithms. Fuel injector characterization functions convert the desired fuel mass into an injector on time, which is executed by fuel injector outputs of the ECM 124.

The throttle actuator module 138 may monitor the position of the throttle valve 136 using one or more throttle position sensors (TPS) 198. The ambient temperature of air being drawn into the engine control system may be measured using an intake air temperature (IAT) sensor 200. The ECM 124 may use signals from the sensors disclosed herein to make control decisions for the engine control system.

The ECM 124 may communicate with DCT control module 121 to coordinate shifting gears in the DCT 13. For example, the ECM 124 may reduce torque during a gear shift. The ECM 124 may communicate with a hybrid control module 202 to coordinate operation of the ICE 12 and an electric motor 204. In one embodiment, the hybrid control module 202 and the electric motor 204 are not included in the DCT drivetrain system 10. In various implementations, the DCT control module 121, the ECM 124, and the hybrid control module 202 may be integrated into one or more modules.

Figure 3:
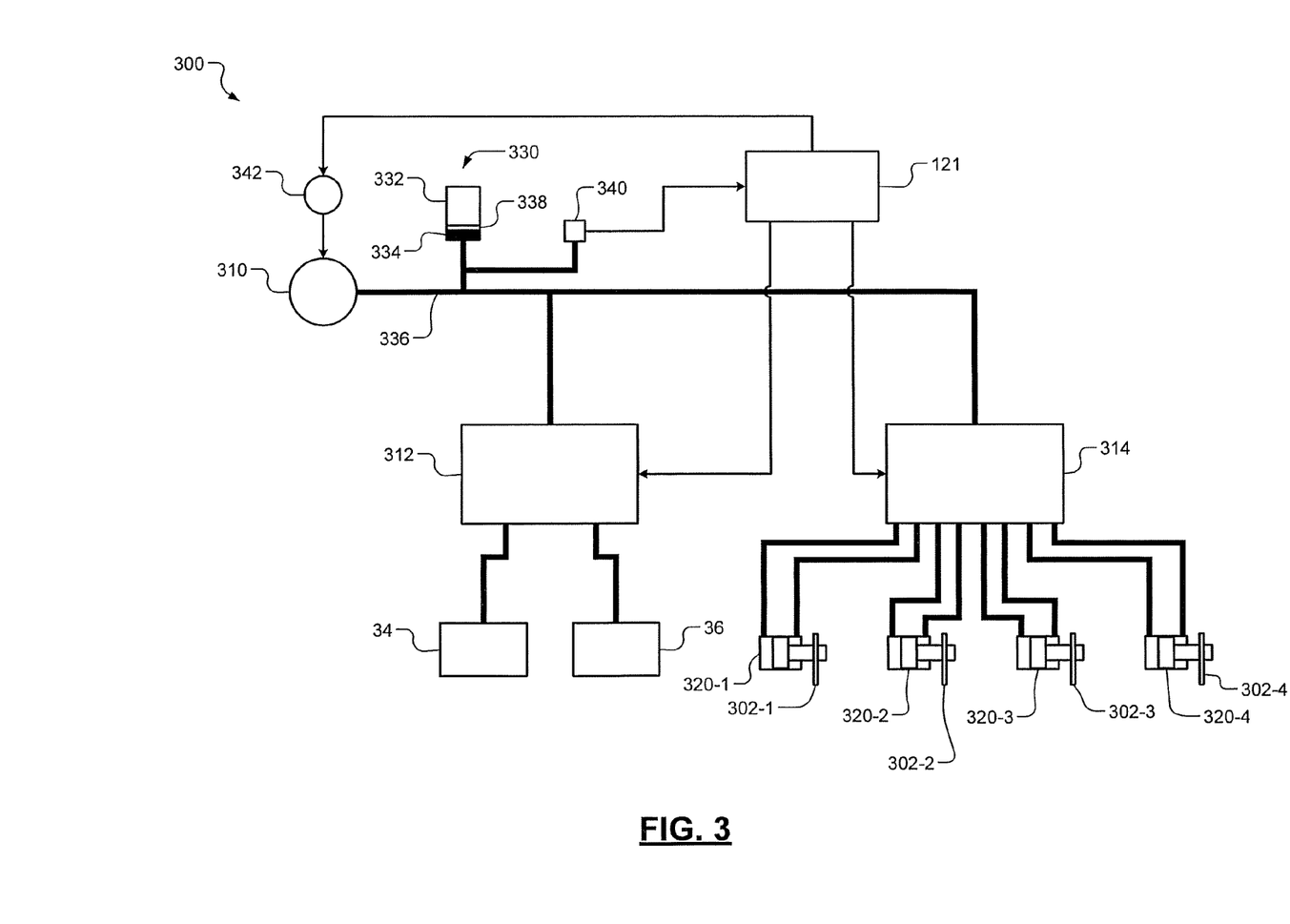
FIG. 3. is a functional block diagram of an exemplary oil flow system for a DCT according to the present disclosure.

Referring now to FIG. 3, a DCT oil flow system 300 communicates with shift forks 302-1, 302-2, 302-3, and 302-4, referred to collectively as shift forks 302, which correspond to the synchronizers 110, 112, 114, 116 (as shown in FIG. 2), and first and second clutch elements (e.g. first and second clutch elements 34, 36).

An electric pump 310 is in fluid communication with clutch control solenoids 312 and shift rail control solenoids and valves 314. The DCT control module 121 controls operation of the clutch control solenoids 312 and the shift rail control solenoids and valves 314. The pump 310 applies fluid pressure to actuate the first and second clutch elements 34, 36 via clutch control solenoids 312. Conversely, the pump 310 applies fluid pressure to actuate pistons 320-1, 320-2, 320-3, and 320-4, referred to collectively as pistons 320, via the shift rail control solenoids and valves 314. The pistons 320 actuate respective ones of the shift forks 302.

The DCT oil flow system 300 includes an accumulator 330. For example only, the accumulator 330 may be a nitrogen charged accumulator. The accumulator 330 includes a first chamber 332 that contains a pressurized gas such as nitrogen and a second chamber 334 that contains hydraulic fluid (e.g. transmission oil) and is in fluid communication with hydraulic (e.g. oil) line 336. The accumulator 330 includes a floating piston 338. The accumulator 330 stores the oil in the second chamber 334 under pressure exerted by the gas in the first chamber 332 on the floating piston 338.

The first chamber 332 is charged to provide a desired pressure on the oil contained in the second chamber 334. The DCT control module 121 measures and/or estimates pressure of the accumulator 330. For example, the DCT control module 121 may communicate with a pressure sensor 340. The DCT control module 121 determines a pre-charge pressure (i.e. a pressure at or before vehicle startup) and dynamic pressure estimates of the accumulator during vehicle operation. The DCT control module 121 turns a pump motor 342 on and off based on the pressure estimates, previously measured pre-charge pressures, and other system measurements and/or estimates, including, but not limited to, an oil volume estimate, system temperatures, and various vehicle operating modes.

Figure 4:
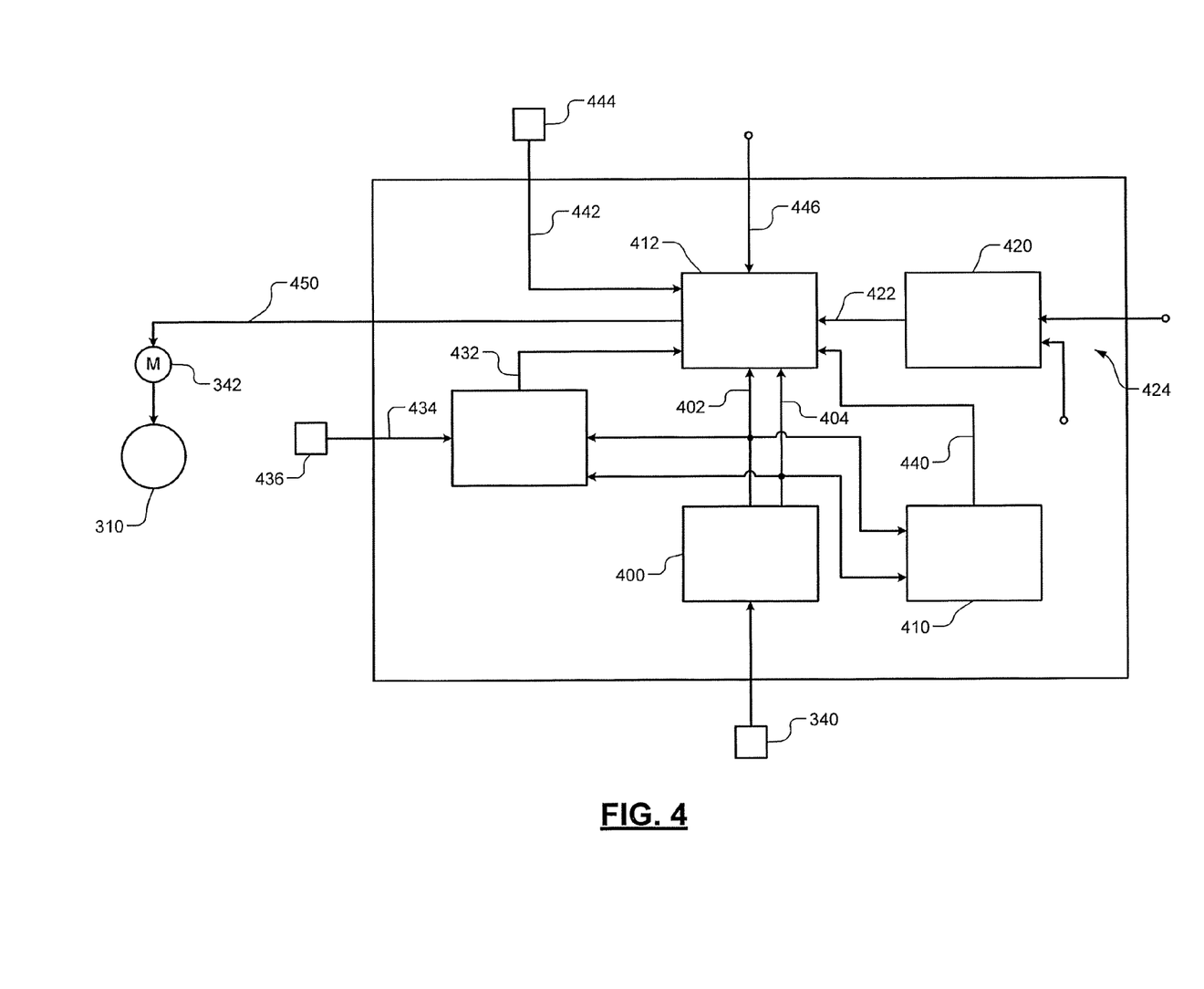
FIG. 4 is a functional block diagram of a DCT control module according to the present disclosure.

Referring now to FIG. 4, the DCT control module 121 is shown in more detail. The DCT control module 121 includes a pressure determination module 400. The pressure determination module 400 determines a pre-charge pressure 402 of the accumulator 330 based on, for example, a measurement of the pressure sensor 340. The pressure determination module 400 determines the pre-charge pressure 402 at vehicle startup (e.g. before charging of the accumulator 330) and stores the pre-charge pressure 402 in memory 410.

The pressure determination module 400 further determines a main pressure 404 during operation of the vehicle (i.e. while the vehicle is running after the accumulator 330 is charged). For example, the pressure determination module 400 may determine the main pressure 404 conditionally and/or periodically. The pressure determination module 400 provides the main pressure 404 to motor control module 412 and/or may store the main pressure 404 in the memory 410.

A mode determination module 420 determines a pump optimization mode 422. For example, the mode determination module 420 may receive one or more input signals 424 generated within the DCT control module 121 and/or from one or more vehicle components external to the DCT control module 121.

The mode determination module 420 determines the pump optimization mode 422 based on the input signals 424. For example, the pump 310 may operate differently based on different driving situations. In particular, pressure demands within the oil flow system 300 may vary in different driving situations and the pump 310 operates according to the different pressure demands. Driving situations that may cause different pressure demands include, but are not limited to, braking, shifting (e.g. downshifting), high torque demand, high acceleration, vehicle launching, and/or economy driving. The input signals 424 may be indicative of one or more different driving situations.

An oil volume determination module 430 determines an oil volume 432 of the accumulator 330. For example, the oil volume determination module 430 may receive the pre-charge pressure 402, the main pressure 404, and a transmission oil temperature 434. The oil volume determination module 430 may receive the transmission oil temperature 434 from an oil temperature sensor 436. The oil volume determination module 430 determines the oil volume 432 based on the pre-charge pressure 402, the main pressure 404, and the oil temperature 434.

The motor control module 412 controls on/off activation and a speed of the pump motor 342. For example, the motor control module 412 may receive system variables such as the pre-charge pressure 402, the main pressure 404, previously stored pre-charge pressures 440, the pump optimization mode 422, and the oil volume 432. The motor control module 412 may also receive an ambient temperature 442 (e.g. from an ambient temperature sensor 444) and clutch temperatures 446 (e.g. an estimate of temperatures of clutch elements 34 and 36). The motor control module 412 controls the pump motor 342 based on the received system variables. In this manner, the motor control module 412 optimizes operation of the pump 310 based on dynamic vehicle conditions.

For example, the motor control module 412 may store adjustable setpoints that determine when the motor control module 412 turns the pump motor 342 on and off based on measurements of the main pressure 404. A first setpoint may determine when the motor control module 412 turns the pump motor 342 on. The first setpoint may indicate that the pressure in the accumulator 330 has reached a recharge pressure (e.g. a low pressure threshold indicating that the pressure of the oil flow system 300 needs to be recharged). The recharge pressure may be a predetermined amount greater than a minimum pressure required for proper operation of the oil flow system 300 (e.g. operation of the clutch elements 34, 36 and the shift forks 302). For example, the pressure in the accumulator 330 may decrease abruptly in certain driving situations (e.g. during a shift). The predetermined amount between the minimum pressure and the recharge pressure acts as a buffer to prevent the pressure from decreasing below the minimum pressure. Accordingly, when the main pressure 404 is less than or equal to the first setpoint, the motor control module 412 turns the pump motor 342 on.

A second setpoint may determine when the motor control module 412 turns the pump motor 342 off. The second setpoint may indicate that the pressure in the accumulator 330 has reached a maximum pressure for the oil flow system 300. The second setpoint may be a predetermined amount less than the maximum pressure for the oil flow system 300. Accordingly, when the main pressure 404 is greater than or equal to the second setpoint, the motor control module 412 turns the pump motor 342 off.

The motor control module 412 adjusts the setpoints based on, for example, the pump optimization mode 422, the ambient temperature 442, and the clutch temperatures 446. For example, the measured main pressure 404 and/or desired setpoints may vary based on ambient temperature 442 and the clutch temperatures 446. The motor control module 412 (and/or the memory 410) may store one or more lookup tables that correlate setpoints for both the first setpoint (i.e. the recharge pressure) and the second setpoint to various ambient and clutch temperatures. The motor control module 412 may select the setpoints from the lookup table based on the temperatures and/or further adjust the selected setpoints based on the pump optimization mode 422 (e.g. based on whether the vehicle is braking, launching, shifting, etc). The motor control module 412 may also adjust a motor command signal 450 that controls the pump motor 342 based on the pump optimization mode 422.

The motor control module 412 may adjust the first setpoint (i.e. the recharge pressure) further based on the pre-charge pressure 402, stored pre-charge pressures 440, and estimated gas leakage in the accumulator 330. For example, when the pre-charge pressure 402 is measured, the motor control module 412 compares the pre-charge pressure 402 to the stored pre-charge pressures 440. Some variance between the pre-charge pressure 402 and the stored pre-charge pressures 440 may occur due to temperature variations. However, after accounting for temperature variations during measurement of the pre-charge pressure 402, further variance may indicate a loss of pressure or oil volume in the accumulator 330 due to gas leakage. Accordingly, the motor control module 412 may estimate the gas leakage based on the pre-charge pressure 402, the stored pre-charge pressures 440, and the oil volume 432. The motor control module 412 may adjust the first setpoint to compensate for the estimated gas leakage. Further, the motor control module 412 may adjust the motor command signal 450 during operation of the pump motor 342 to compensate for the estimated gas leakage.

Figure 5:
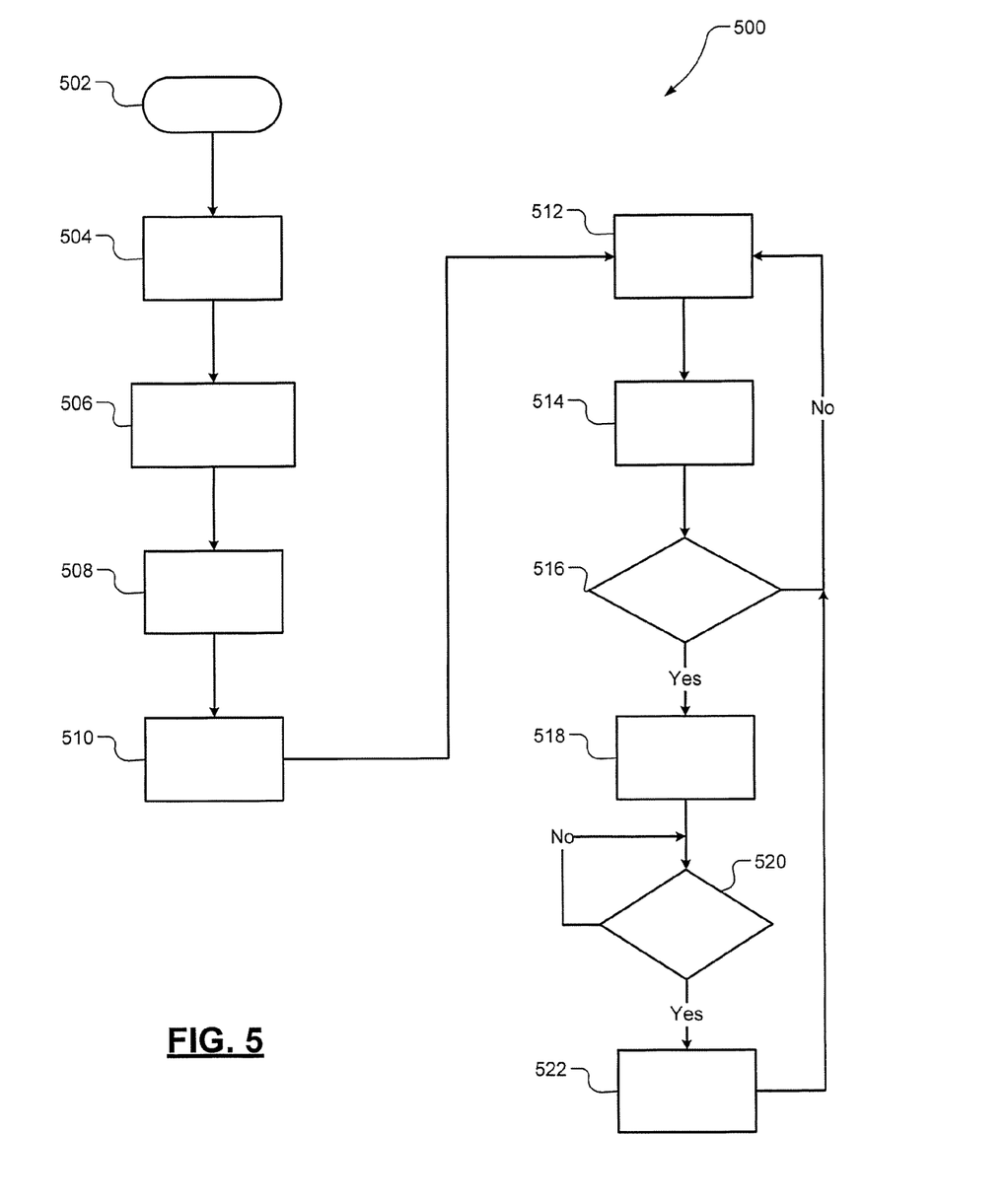
FIG. 5 is a flow diagram illustrating steps of an accumulator volume management method according to the present disclosure.

Referring now to FIG. 5, an accumulator volume management method 500 begins in step 502. In step 504, the method 500 measures and stores a pre-charge pressure. For example, the method 500 measures the pre-charge pressure at vehicle startup using a pressure sensor. In step 506, the method 500 determines an actual pre-charge pressure based on the measured pre-charge pressure, previously stored pre-charge pressures, and ambient temperature. In step 508, the method 500 operates a pump motor to pressurize the oil flow system based on the actual pre-charge pressure. In step 510 the method 500 turns off the pump motor when a main pressure reaches a maximum pressure.

In step 512, the method 500 determines pressure setpoints (e.g. first and second pressure setpoints. For example, the method 500 may determine the setpoints based on ambient temperature, estimated gas leakage, pump optimization mode, and the actual pre-charge pressure. In step 514, the method 500 monitors a main pressure. In step 516, the method 500 determines whether the main pressure is less than or equal to the first pressure setpoint (e.g. which corresponds to a recharge pressure). If true, the method 500 continues to step 518. If false, the method continues to step 512.

In step 518, the method 500 turns on the pump motor. In step 520, the method 500 determines whether the main pressure is greater than or equal to the second pressure setpoint (e.g. which corresponds to a maximum pressure). If true, the method 500 continues to step 522. If false, the method 500 continues to step 520. In step 522, the method 500 turns off the pump motor and continues to step 512.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dual clutch transmission (DCT) control module, comprising:
   a pressure determination module that determines a measured pre-charge pressure of an accumulator; and
   a motor control module that determines an ambient temperature, receives at least one stored previous pre-charge pressure, and calculates an actual pre-charge pressure based on the measured pre-charge pressure, a value of the at least one stored previous pre-charge pressure, and the ambient temperature, and that controls a pump motor based on the actual pre-charge pressure.

2. The DCT control module of claim 1 wherein the motor control module calculates the actual pre-charge pressure based in part on a lookup table.

3. The DCT control module of claim 1 further comprising an oil volume determination module that determines an oil volume in the accumulator based on the measured pre-charge pressure, a measured main pressure, and an oil temperature.

4. The DCT control module of claim 3 wherein the motor control module estimates gas leakage based on the oil volume, the ambient temperature, and the actual pre-charge pressure.

5. The DCT control module of claim 4 wherein the motor control module controls the pump motor further based on the gas leakage.

6. The DCT control module of claim 4 wherein the motor control module determines a recharge pressure based on the measured pre-charge pressure, the stored previous pre-charge pressures, and the gas leakage.

7. The DCT control module of claim 6 wherein the recharge pressure is a predetermined amount greater than a minimum desired pressure.

8. The DCT control module of claim 7 wherein the motor control module turns the pump motor on based on the recharge pressure.

9. The DCT control module of claim 1 further comprising a mode determination module that determines a pump optimization mode based on at least one driving situation.

10. The DCT control module of claim 9 wherein the at least one driving situation includes at least one of braking, shifting, high torque demand, high acceleration, vehicle launching, and economy driving situations.

11. The DCT control module of claim 9 wherein the motor control module controls the pump motor further based on the pump optimization mode.

12. A method for controlling a dual clutch transmission (DCT), the method, comprising:
    determining a measured pre-charge pressure of an accumulator;
    determining an ambient temperature;
    receiving at least one stored previous pre-charge pressure;
    calculating, using a motor control module, an actual pre-charge pressure based on the measured pre-charge pressure, a value of the at least one stored previous pre-charge pressure, and the ambient temperature; and
    controlling a pump motor based on the actual pre-charge pressure.

13. The method of claim 12 further comprising determining the actual pre-charge pressure based in part on a lookup table.

14. The method of claim 12 further comprising determining an oil volume in the accumulator based on the measured pre-charge pressure, a measured main pressure, and an oil temperature.

15. The method of claim 14 further comprising estimating gas leakage based on the oil volume, the ambient temperature, and the actual pre-charge pressure.

16. The method of claim 15 further comprising controlling the pump motor further based on the gas leakage.

17. The method of claim 15 further comprising determining a recharge pressure based on the measured pre-charge pressure, the stored previous pre-charge pressures, and the gas leakage.

18. The method of claim 17 wherein the recharge pressure is a predetermined amount greater than a minimum desired pressure.

19. The method of claim 18 further comprising turning the pump motor on based on the recharge pressure.

20. The method of claim 12 further comprising determining a pump optimization mode based on at least one driving situation.

21. The method of claim 20 wherein the at least one driving situation includes at least one of braking, shifting, high torque demand, high acceleration, vehicle launching, and economy driving situations.

22. The method of claim 20 further comprising controlling the pump motor further based on the pump optimization mode.

* * * * *